Patented Jan. 8, 1935

1,986,828

UNITED STATES PATENT OFFICE 1,986,828

FREE CUTTING ALLOY

William L. Fink, Oakmont, Pa., assignor to Aluminum Company of America, Pittsburgh, Pa., a corporation of Pennsylvania No Drawing. Application September 18, 1933, Serial No. 689,893

3 Claims. (Cl. 75—1)

The invention relates to aluminum base alloys and is particularly concerned with such alloys containing copper, manganese and silicon.

An extensively used alloy of this nature contains from about 3.0 per cent to about 5.5 per cent of copper, from about 0.25 per cent to about 1.5 per cent of manganese, and from about 0.25 per cent to about 2.0 per cent of silicon, the balance being commercial aluminum. This alloy can be mechanically deformed by the well known commercial processes such as rolling, forging, drawing, or extrusion. The grain is thereby refined and the physical properties considerably improved and suitable thermal treatments have been devised to enhance the improvement. The alloy has been used for many applications among which may be mentioned airplane propellers and connecting rods for internal combustion engines.

There are, however, some applications wherein the alloy might be conveniently and profitably used were it not for an inherent disadvantage which militates against its use in these applications. Mechanical cutting operations such as drilling, shaping, or lathe-cutting are successfully carried out only by using certain precautions which increase the cost of production and perhaps favor the choice of another alloy which can be machined more readily but which is in other respects, for instance in physical properties, not so desirable. When alloys are difficult to machine this disadvantage becomes evident in many cases through rapid wear of the cutting tool edge which necessitates frequent resharpening. In such cases where machining is difficult, continual lubrication is required, the machined surface is rough and irregular, and the chip has a tendency to form continuous curls or spirals that may foul the tool or the operating parts of the machine. The desirability is immediately apparent of an alloy of good working characteristics, and outstanding physical properties, yet possessing favorable machining qualities so that finish machining operations may be performed economically, successfully, and may be productive of a pleasing surface appearance.

Accordingly an object of the invention is the production of an aluminum base alloy containing from about 3.0 per cent to about 5.5 per cent of copper, from about 0.25 per cent to about 1.5 per cent of manganese and from about 0.25 per cent to about 2.0 per cent of silicon which may be readily and economically subjected to cutting operations.

My invention resides in the discovery that this object is effected by the addition of from 0.05 to about 1.5 per cent of cadmium to the aforesaid aluminum-copper-manganese-silicon alloys.

I have found that cadmium is an alloying constituent which has a very favorable effect on the machining properties of aluminum base alloys. In this specification and in the appended claims, I use the term "free machining" when applied to this constituent, to indicate this advantageous effect on the machining properties, as evidenced by the fact that the alloys containing cadmium within the disclosed range may be machined more rapidly, with less tool wear, less tool sharpening, better quality of chip, and better machined surface than similar alloys not containing cadmium.

Although the machinability of the alloys herein disclosed may be improved by the addition of from about 0.05 to 1.5 per cent cadmium, I prefer to use between about 0.25 and 1.2 per cent of this element. A preferred composition which exemplifies the physical properties of the base alloy and the improvement in machining quality gained through the use of cadmium is an alloy containing about 4.4 per cent of copper, 0.8 per cent of silicon, 0.8 per cent of manganese, and 1 per cent of cadmium, the balance being substantially all aluminum.

The addition of cadmium to the aluminum-copper-manganese-silicon alloys of the class hereinabove described not only improves the machining characteristics but also effects an increase in the tensile strength, yield point, shear strength, and Brinell hardness values with a corresponding decrease in elongation. This feature is of particular advantage in applications where an alloy must be machined that is in a thermally treated condition conducive to maximum strength and hardness. It is thus possible to attain high strength and a satisfactory machining quality in the same alloy, a combination of properties heretofore difficult to obtain.

The cadmium may be most conveniently added by introducing it into the molten aluminum alloy in solid metallic form since it melts at a point considerably below that of aluminum or its alloys. It is desirable to keep the temperature of the molten alloy below about 1400° F. to avoid excessive volatilization of the cadmium. When once added, the melt should be vigorously stirred to insure a uniform mixture of the cadmium in the alloy.

The term "aluminum" used herein and in the appended claims, embraces the usual impurities found in aluminum ingot of commercial grade or picked up in the course of handling operations incident to ordinary melting practice.

The alloys herein disclosed may be subjected to the usual thermal treatments familiar to those skilled in the art for the purpose of improving or altering their physical characteristics.

I claim:

1. An aluminum base alloy consisting of from about 3 to 5.5 per cent of copper, from about 0.25 to 1.5 per cent of manganese, from about 0.25 to 2 per cent of silicon and from about 0.05 to 1.5 per cent of cadmium, balance aluminum.

2. An aluminum base alloy consisting of from about 3 to 5.5 per cent of copper, from about 0.25 to 1.5 per cent of manganese, from about 0.25 to 2 per cent of silicon and from about 0.25 to 1.2 per cent of cadmium, balance aluminum.

3. An aluminum base alloy containing about 4.4 per cent of copper, about 0.8 per cent of manganese, about 0.8 per cent of silicon, and about 1 per cent of cadmium, the balance being aluminum.

WILLIAM L. FINK.